(12) United States Patent
Nakane et al.

(10) Patent No.: US 6,302,485 B1
(45) Date of Patent: Oct. 16, 2001

(54) HEAD REST DEVICE FOR VEHICLES

(75) Inventors: Hidetoshi Nakane; Nobuhiko Takeda; Satoshi Kawaguchi, all of Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/635,483

(22) Filed: Aug. 9, 2000

(30) Foreign Application Priority Data

Aug. 9, 1999 (JP) .................................................. 11-225570

(51) Int. Cl.$^7$ ...................................................... A47C 7/36
(52) U.S. Cl. ............................................. 297/408; 297/391
(58) Field of Search .................................... 297/408, 403, 297/391, 404

(56) References Cited

U.S. PATENT DOCUMENTS

| | | | |
|---|---|---|---|
| 4,576,411 | * | 3/1986 | Kitamura . |
| 4,623,166 | | 11/1986 | Andres et al. . |
| 4,674,797 | * | 6/1987 | Tateyama . |
| 5,590,933 | * | 1/1997 | Andersson . |
| 6,045,181 | * | 4/2000 | Ikeda et al. . |

FOREIGN PATENT DOCUMENTS

| | | |
|---|---|---|
| 62-111453 | 7/1987 | (JP) . |
| 1-164310 | 6/1989 | (JP) . |

* cited by examiner

*Primary Examiner*—Milton Nelson, Jr.
(74) *Attorney, Agent, or Firm*—Burns, Doane, Swecker & Mathis, LLP

(57) ABSTRACT

A head rest device for a vehicle seat includes a head rest body against which is to be rested a head of an occupant seated in the vehicle seat, a stay member supporting the head rest body and fixed to a seat back frame of a seat back of the vehicle seat, a stopper member fixed to the stay member and having a stopper portion, a rotating element rotatably supported on the stay member, and an operating member for operating the head rest body between a used position and a non-used position. The operating member is slidable relative to the rotating element and includes an operating lever manually operated to change the head rest body position and a locking element engageable with the stopper portion of the stopper member. A spring member has one end engaging the stopper member and the other end engaging the rotating element so that rotation of the rotating element is permitted by the release of the engagement between the locking element and the stopper portion of the stopper member by the slideable movement of the operating member.

18 Claims, 3 Drawing Sheets

HEAD REST DEVICE FOR VEHICLES

This application is based on and claims priority under 35 U.S.C. §119 with respect to Japanese Application No. 11(1999)-225570 filed on Aug. 9, 2000, the entire content of which is incorporated herein by reference.

FIELD OF THE INVENTION

This invention generally relates to a head rest device. More particularly, the present invention pertains to a head rest device to be mounted on the seat back of the rear seat of a vehicle.

BACKGROUND OF THE INVENTION

The head rest device is an important element for keeping an occupant seated in a vehicle seat in a comfortable position by supporting the occupant's head. The head rest device installed on the central seat of the vehicle rear seats is usually foldable downward while no one is seated in the central seat to give a wide rear field of view to the driver or a passenger seated in the front seat.

An example of a known head rest device for a rear seat is disclosed in Japanese Published Patent Application No. 1(1989)-164310. This known head rest device is designed to be folded downwardly in a rearward direction by operating an element biased by a spring force for releasing a locking mechanism.

Another example of a known head rest device of this type is disclosed in Japanese Published Utility Model Application No. 62(1987)-111453. The head rest device described in this publication is pushed down or pulled up for effecting disengagement or engagement of a latch and pawl mechanism.

These conventional head rest devices are constructed of many components, and it is difficult to design them with a proper adjusting spring force for keeping the head rest in the folded position upon encountering an accidental force.

In light of the foregoing, a need exists for a head rest device that is not susceptible to the disadvantages and drawbacks pointed out above.

SUMMARY OF THE INVENTION

The head rest device of the present invention generally involves a rotating element rotatable relative to a horizontal axis of a head rest stay member and provided with an operating lever. A stopper element is secured to the horizontal axis of the stay member and a locking element control engagement and disengagement between the stopper element and the operating lever. In accordance with the present invention, undesired movement of the head rest device due to an unexpected large external force is inhibited or prevented by the engagement of the locking element with the stopper element.

The head rest device of the present invention further includes a torsion bar or coil spring for biasing the rotating element in one direction. One end of the spring is secured to the stopper element and the other end is engaged with an engaging portion provided on the rotating element for slidable engagement of the spring with the engaging portion of the rotating element. The head rest device is thus able to adjust a load applied thereon in response to the head rest device positions by changing the fulcrum point of the spring.

According to the present invention, the vehicle seat head rest device includes a head rest body against which is to be rested a head of an occupant seated in the vehicle seat, a stay member on which is mounted the head rest body, with the stay member being fixed to a seat back frame of a seat back of the vehicle seat, a stopper member fixed to the stay member and having a stopper portion, and a rotating member rotatably mounted on the stay member and supporting the head rest body. An operating member slidably engages the rotating member and has a locking mechanism engageable with the stopper portion of the stopper member. A spring member has one end in engagement with the stopper member and another end in engagement with the rotating member, with the rotating member being rotatable upon release of engagement between the locking mechanism and the stopper portion of the stopper member by sliding movement of the operating member.

In accordance with another aspect of the invention, a head rest device mountable on a seat back of a vehicle seat includes a head rest body against which is to be rested a head of an occupant seated in the vehicle seat, a stay member adapted to be fixed at a seat back of a vehicle seat, and a rotating member on which is supported the head rest body, with the rotating member being rotatably mounted on the stay member to permit the head rest body to be rotated between an upright position and folded position. A stopper member is fixed to the stay member, and a locking mechanism is movably mounted on the rotating member for movement between a first position in which the locking mechanism engages the stopper member to prevent the head rest body from rotating and a second position in which the locking mechanism is disengaged from the stopper member to permit the head rest body to rotate between the upright and folded positions.

According to a further aspect of the invention, a head rest device mountable on a seat back of a vehicle seat includes a head rest body against which is to be rested a head of an occupant seated in the vehicle seat, a stay member adapted to be fixed at a seat back of a vehicle seat, and a rotating member on which is supported the head rest body, with the rotating member being rotatably mounted on the stay member to permit the head rest body to be rotated between an upright position and folded position. A stopper member is fixed to the stay member, and a locking mechanism is movably mounted on the rotating member for movement between a first position in which the locking mechanism engages the stopper member to prevent the head rest body from rotating and a second position in which the locking mechanism is disengaged from the stopper member to permit the head rest body to rotate between the upright and folded positions. A torsion bar engages the stopper member and the rotating member, with the torsion bar slidably engaging the rotating member so that the torsion bar engages the rotating member at an engaging point that varies as the head rest body rotates between the upright and folded positions.

BRIEF DESCRIPTION OF THE DRAWINGS

Additional features and characteristics of the present invention will become more apparent from the following detailed description considered with reference to the accompanying drawing figures in which like elements are designated by like reference numerals and wherein.

DETAILED DESCRIPTION OF THE INVENTION

Figure 1:
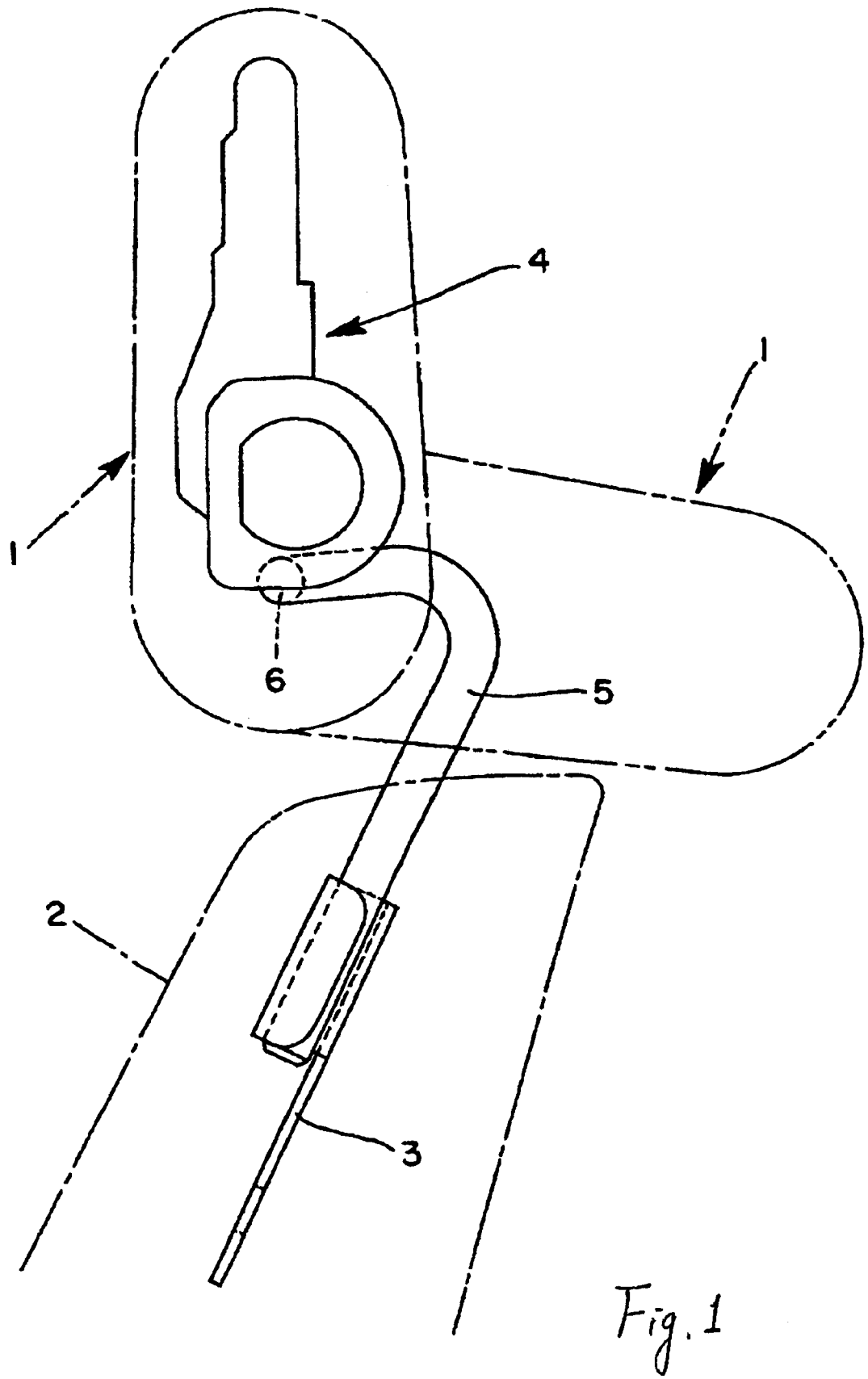
FIG. 1 is a side view of the head rest device of the present invention illustrating the head rest in a used position and in a retracted or housed position.

FIG. 1 illustrates the upper portion of an upright seat back of a rear vehicle seat and the head rest device that is supported on the seat back. The head rest device 4 includes a head rest body 1 supported on a frame 3 of the seat back 2 of the vehicle rear seat by virtue of a stay member 5. The stay member 5 includes a horizontal shaft 6. The head rest body 1 is rotatable and possesses a rotating center coincident with or on the axis of the horizontal shaft 6 of the stay member 5. The head rest 1 is adapted to be selectively moved between two positions and positioned at one of the two positions. The two positions are an upright position (i.e., a used position) and a folded position (i.e., a non-used position).

Figure 2:
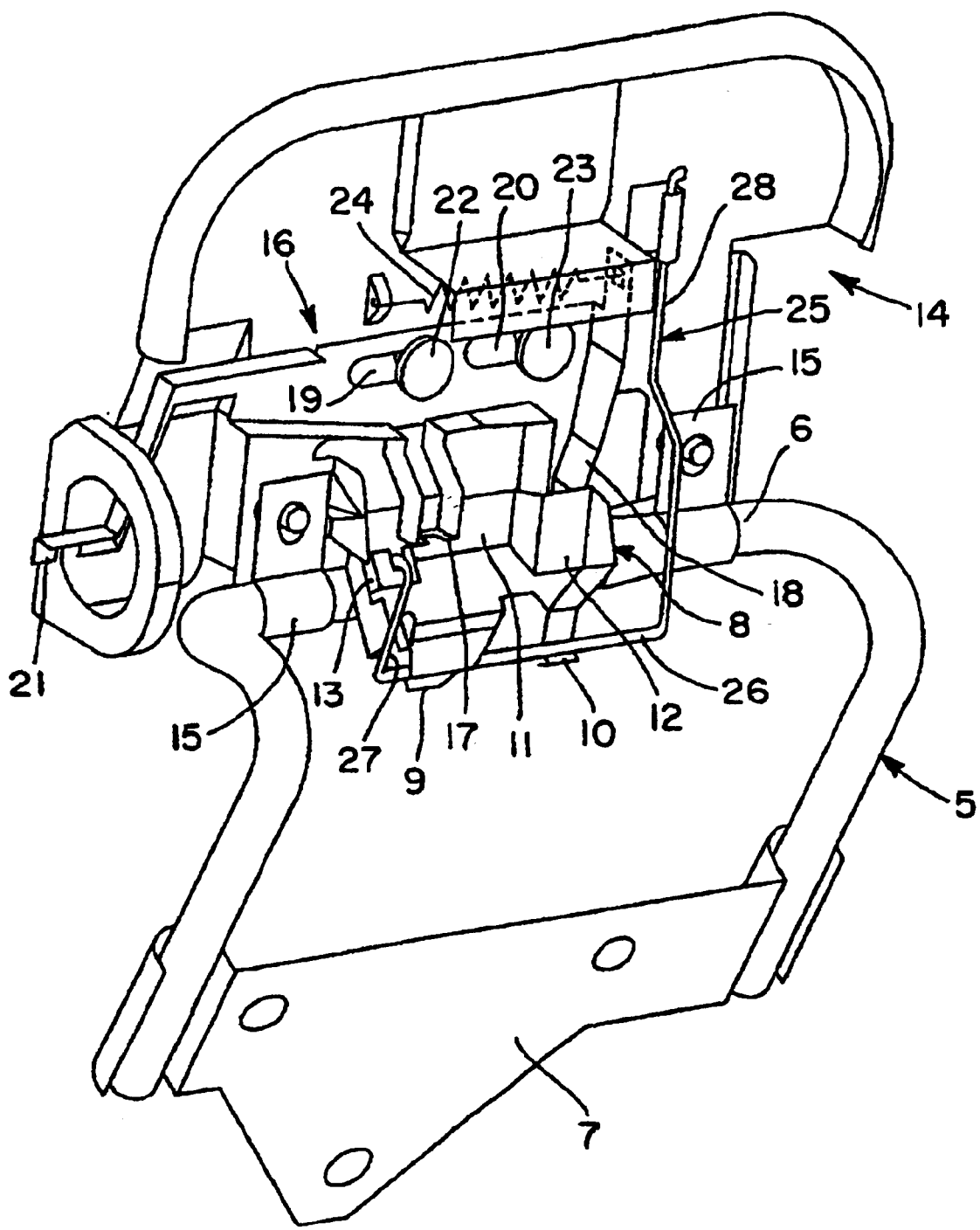
FIG. 2 is a perspective view of the head rest device of the present invention as seen from the rear side.

FIG. 2 illustrates the details associated with the head rest device 4. The stay member 5 of the head rest device, which is secured to the frame 3 of the vehicle seat back as shown in FIG. 1, is formed from a metal element (e.g., a pipe or pipe-like element) having a reverse U-shaped configuration. This reverse U-shaped configuration includes a pair of spaced apart and downwardly extending leg portions that are connected together by the horizontal shaft portion 6. A connecting plate is secured to and extends between the pair of leg portions. As illustrated in FIG. 2, the horizontal shaft portion 6 of the reverse U-shaped stay member 5 plunges or is positioned slightly forwardly with respect to the leg portions.

A stopper element 8 is secured on the central portion of the horizontal shaft portion 6. The lower portion of the stopper element 8 has a pair of downwardly extending leg portions 9, 10. The upper portion of the stopper element 8 also has laterally stepped stopper portions 11, 12.

A spring hanging or engaging portion 13 is provided at the upper portion of one of the leg portions 9 for hanging or engaging a spring. Further details associated with the spring will be set forth below.

Figure 3:
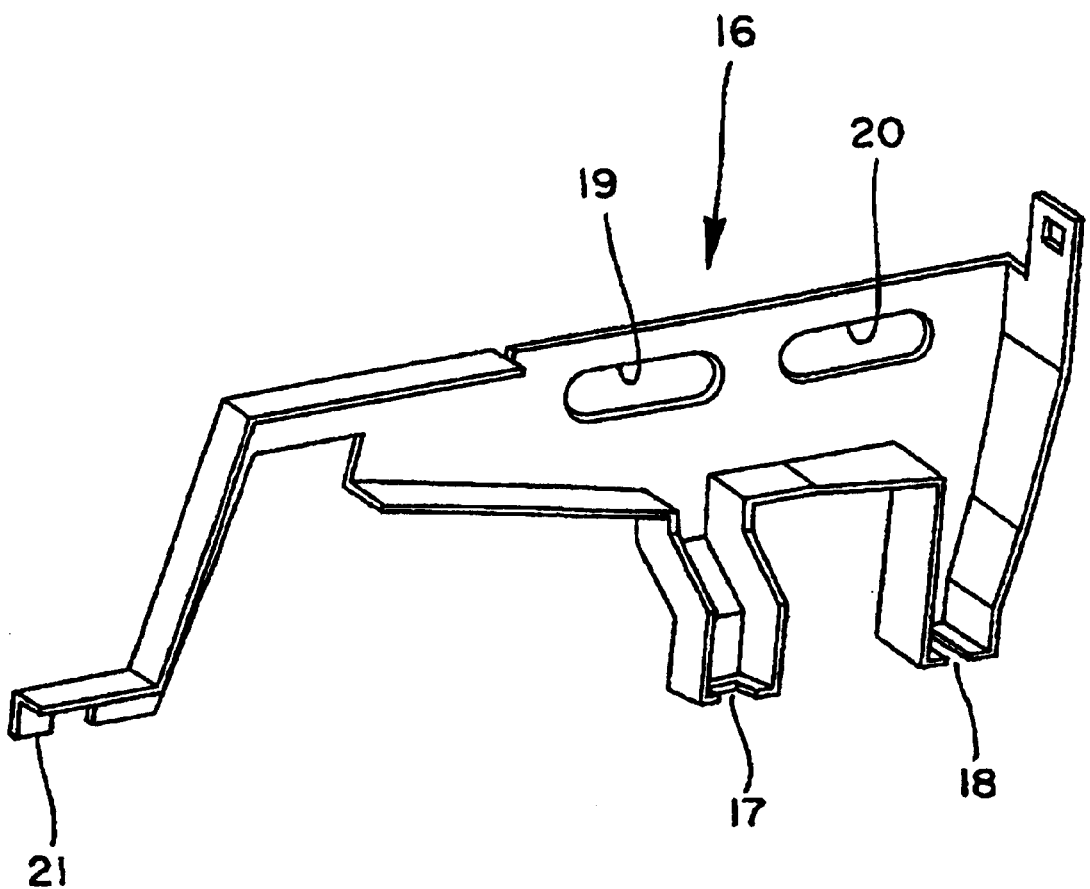
FIG. 3 is a plan view of the operating lever of the head rest device of the present invention.

A rotating element 14 is rotatably supported on the horizontal shaft portion 6 of the stay member 5 through a pair of U-shaped brackets 15, 15 that are arranged on opposite sides of the stopper element 8. The head rest body 1 is supported by the rotating member 14. An operating lever 16, the details of which are illustrated in FIG. 3, includes a locking mechanism in the form of a pair of downwardly extending and separately provided spaced apart locking elements 17, 18, a pair of elongated holes 19, 20, and an operating portion 21. The operating lever 16 is press formed from a metal plate. It may be preferable to configure the operating lever so that it possesses a channel-shaped cross-section providing rigidity to the locking elements 17, 18.

The operating lever 16 is laterally slidable with respect to the rotating element 14 by a pair of pins 22, 23 each positioned in a respective elongated hole 19, 20 provided in the operating lever 16. A generally horizontally extending spring 24 is provided between the rotating element 14 and the operating lever 16 for biasing the operating lever 16 in the left direction as viewed in FIG. 2.

As viewed in FIG. 2, the operating lever 16 is always biased by the force of the spring 24 to keep the head rest body 1 in the upright position (i.e., the use position) by engaging the locking element 17 with the rear surface of one of the stoppers 11 and by engaging the locking element 18 with the front surface of the other stopper 12. The rotating element 14 is thus prevented from moving in both the forward and rearward directions so that the head rest body 1 is kept in the upright position.

The head rest body 1 is further supported by a torsion bar 25 which is approximately U-shaped. The horizontal portion 26 of the U-shaped torsion bar 25 is in contact with the front and rear surfaces of the pair of leg portions 9, 10 of the stopper element 8. One leg portion 27 of the U-shaped torsion bar 25 is shorter than the other leg portion 28. The shorter leg portion 27 engages the spring hanging portion 13 of the stopper element 8 while the longer leg portion 28 is slidably supported on the rotating element 14.

Because the point of engagement of the longer leg portion 28 with the rotating element 14 can be changed while the head rest body 1 position changes between the upright and folded positions, the rotational center of the torsion bar 25 necessarily does not match the rotational center of the rotating element 14. The torsion bar 25 applies its spring force to the head rest body 1 for preventing rattling in the upright and folded positions of the head rest body 1. To improve the rigidity of the locking elements 17, 18, each of them may be connected to the other by a curling flange.

In FIG. 2, the head rest body is in its upright position. When the operating portion 21 is pushed in the rightward direction, the operating lever 16 is moved to the right while being guided by the engagement of the pins 22, 23 in the elongated holes 19, 20. This movement results in a release of the engagement of the locking element 18 and the stopper portion 12. Under this condition, the head rest body 1 can be rearwardly folded to the housed position. The rearward movement of the head rest body 1 is stopped by the engagement of the locking element 17 with the leg portion 9. By releasing the pushing force applied to the operation portion 21, the operating lever 16 returns to the left as viewed in FIG. 2 by the biasing force of spring 24. The locking element 18 then contacts the lower side of the rear surface of the stopper portion 12 to restrict the upright movement of the head rest body 1. The spring force of the torsion bar 25 prevents the head rest body 1 from the rattling in the folded or non-used position.

To return the head rest body 1 to the upright position, the operating portion 21 of the operating lever 16 is once again pushed to the right as viewed in FIG. 2 against the biasing force of spring 24. The locking element 18 thus moves outwardly to release the engagement with the stopper portion 12. The rotating element 14 is thus rotatable to the upright or use position. After the head rest body 1 is in the upright or use position, the operating lever 16 is released, and the lever 16 returns to the position shown in FIG. 2 by the biasing force of the spring 24. The locking element 16 thus once again contacts the stopper portion 12 and prevents movement of the head rest body 1 so that the head rest body 1 is fixed in the upright position.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the sprit of the present invention. Accordingly, it is expressly intended that all such variations, changes and equivalents which fall within the sprit and scope of the present invention as defined in the claims be embraced thereby.

What is claimed is:

1. A head rest device on a vehicle seat comprising:
   a head rest body;
   a stay member on which is mounted the head rest body, the stay member being fixed to a seat back frame of a seat back of the vehicle seat;

a stopper member fixed to the stay member and having a stopper portion;

a rotating member rotatably mounted on the stay member and supporting the head rest body;

an operating member slidably engaged with the rotating member and having a locking mechanism engageable with the stopper portion of the stopper member;

a spring member having one end in engagement with the stopper member and another end in engagement with the rotating member, the rotating member being rotatable upon release of engagement between the locking mechanism and the stopper portion of the stopper member by sliding movement of the operating member.

2. A head rest device according to claim 1, wherein the locking mechanism includes a pair of locking elements, one of the locking elements being engageable with one surface of the stopper portion of the stopper member and the other of the locking elements is engageable with an opposite surface of the stopper portion of the stopper member.

3. A head rest device according to claim 2, wherein the operating member includes a pair of elongated holes, and including a pair of pins extending from the rotating member, each of the pins being positioned in one of the elongated holes.

4. A head rest device according to claim 3, wherein the spring member is a torsion bar engageable with the rotating member, an engaging point of the torsion bar with the rotating member being changeable depending on a position of the rotating member.

5. A head rest device according to claim 4, wherein the torsion bar engages a leg portion of the stopper member.

6. A head rest device according to claim 5, wherein the head rest body is movable between an upright position and a folded position, one of the locking elements contacting the leg portion of the stopper member and the other locking element contacting the stopper portion when the head rest body is in the folded position.

7. A head rest device according to claim 1, wherein the spring member is a torsion bar engageable with the rotating member, an engaging point of the torsion bar with the rotating member being changeable depending on a position of the rotating member.

8. A head rest device according to claim 7, wherein the torsion bar engages a leg portion of the stopper member.

9. A head rest device mountable on a seat back of a vehicle seat comprising:

a head rest body;

a stay member adapted to be fixed at a seat back of a vehicle seat;

a rotating member on which is supported the head rest body, the rotating member being rotatably mounted on the stay member to permit the head rest body to be rotated between an upright position and folded position;

a stopper member fixed to the stay member; and a locking mechanism slidably engaged with the rotating member for movement between a first position in which the locking mechanism engages the stopper member to prevent the head rest body from rotating and a second position in which the locking mechanism is disengaged from the stopper member to permit the head rest body to rotate between the upright and folded positions.

10. A head rest device according to claim 9, wherein the locking mechanism includes a pair of locking elements, one of the locking elements being engageable with one surface of the stopper member and the other of the locking elements being engageable with an opposite surface of the stopper member.

11. A head rest device according to claim 9, wherein the locking mechanism includes a pair of elongated holes, and including a pair of pins extending from the rotating member, each of the pins being positioned in one of the elongated holes.

12. A head rest device according to claim 9, including a spring member having one end in engagement with the stopper member and an opposite end in engagement with the rotating member.

13. A head rest device according to claim 12, wherein the spring member is a torsion bar, an engaging point of the torsion bar with the rotating member varying as the head rest body rotates between the upright and folded positions.

14. A head rest device according to claim 13, wherein the torsion bar engages a leg portion of the stopper member.

15. A head rest device according to claim 14, wherein the locking mechanism includes a pair of locking elements, one of the locking elements contacting the leg portion of the stopper member when the head rest body is in the folded position and the other locking element contacting a stopper portion of the stopper member when the head rest body is in the folded position.

16. A head rest device mountable on a seat back of a vehicle seat comprising:

a head rest body;

a rotating member on which is supported the head rest body;

a stay member adapted to be fixed at a seat back of a vehicle seat, the rotating member being rotatably mounted on the stay member to permit the head rest body to be rotated between an upright position and folded position;

a stopper member fixed to the stay member;

a locking mechanism movably mounted on the rotating member for movement between a first position in which the locking mechanism engages the stopper member to prevent the head rest body from rotating and a second position in which the locking mechanism is disengaged from the stopper member to permit the head rest body to rotate between the upright and folded positions; and a torsion bar engaging the stopper member and the rotating member, the torsion bar slidably engaging the rotating member so that the torsion bar engages the rotating member at an engaging point that varies as the head rest body rotates between the upright and folded positions.

17. A head rest device according to claim 16, wherein the locking mechanism includes a pair of locking elements, one of the locking elements being engageable with one surface of the stopper member and the other of the locking elements being engageable with an opposite surface of the stopper member.

18. A head rest device according to claim 16, wherein the locking mechanism includes a pair of elongated holes, and including a pair of pins extending from the rotating member, each of the pins being positioned in one of the elongated holes.

* * * * *